(12) United States Patent
Venugopal et al.

(10) Patent No.: US 10,286,964 B2
(45) Date of Patent: May 14, 2019

(54) LOCK MECHANISM FOR A TILTABLE OPERATOR CAB

(71) Applicant: Caterpillar Inc., Peoria, IL (US)

(72) Inventors: Deepu Krishnan Venugopal, Thiruvalla (IN); Ashish Rajiv Honwadkar, Chennai (IN)

(73) Assignee: Caterpillar Inc., Deerfield, IL (US)

( * ) Notice: Subject to any disclaimer, the term of this patent is extended or adjusted under 35 U.S.C. 154(b) by 78 days.

(21) Appl. No.: 15/698,489

(22) Filed: Sep. 7, 2017

(65) Prior Publication Data
US 2019/0071137 A1    Mar. 7, 2019

(51) Int. Cl.
*B62D 33/06* (2006.01)
*B62D 33/07* (2006.01)

(52) U.S. Cl.
CPC ......... *B62D 33/07* (2013.01); *B62D 33/0617* (2013.01)

(58) Field of Classification Search
CPC ..................... B62D 33/07; B62D 33/0617
See application file for complete search history.

(56) References Cited

U.S. PATENT DOCUMENTS

| 7,607,721 | B2 | 10/2009 | Joel et al. |
| 7,896,429 | B2 | 3/2011 | Kim |
| 7,938,478 | B2 | 5/2011 | Kamimae |
| 8,469,130 | B2 | 6/2013 | Gregory et al. |
| 8,998,304 | B2 | 4/2015 | Seunghyun et al. |
| 2009/0038186 | A1* | 2/2009 | Osswald ................ B62D 21/14 37/413 |

FOREIGN PATENT DOCUMENTS

| CN | 203294213 | 11/2013 |
| EP | 2703259 | 5/2017 |

* cited by examiner

*Primary Examiner* — Pinel E Romain

(57) ABSTRACT

A lock mechanism for a tiltable operator cab of a machine is provided. The lock mechanism includes a first bracket which receives a first engagement member of the operator cab. The operator cab is pivotably coupled to an end of the machine. A second bracket receives a second engagement member of the operator cab. The second bracket is located at an offset spaced apart from the first bracket. The lock mechanism includes a sliding member having a first locking pin and a second locking pin. The sliding member slides between a first position and a second position. When the sliding member is in the first position, the first locking pin locks the first bracket with the first engagement member, and the second locking pin locks the second bracket with the second engagement member such that the sliding member locks a tilt motion of the operator cab.

20 Claims, 8 Drawing Sheets

LOCK MECHANISM FOR A TILTABLE OPERATOR CAB

TECHNICAL FIELD

The present disclosure relates to a machine with a tiltable operator cab. More specifically, the present disclosure relates to a lock mechanism for securing the operator cab to the machine and preventing a tilt motion of the operator cab.

BACKGROUND

Operator platform and cabs for vehicles such as harvesters, trucks, earthmovers and the like are generally mounted around engine, transmission and other vehicle components. Generally, mounting of the cabs towards front of the vehicles allows advantages, such as for example, better visibility and easy mounting for an operator onto the vehicles. However, the cabs are often required to be moved from their original horizontal position, for the vehicle in motion, to a tilted position for servicing and like operations. The tilting of the cabs allows substantial space for the operator to access the areas earlier shielded by the cabs which generally warrant regular maintenance and service procedure.

Typically, the cabs are configured with a locking mechanism to secure them to the frame of the vehicle, especially for safety during running state of the vehicle. Further, the locking mechanism is designed keeping in mind dynamic safety of the cabs while the vehicle is in a non-rest state i.e. working, moving, and the like. Additionally, the locking mechanism is expected to be simple, compact, and convenient so as to allow least effort by the operator for actuation titling of the cab(s), and thereby gain access to the otherwise shielded areas.

For example, European Patent number EP 2,703,259 (hereinafter referred to as reference '259) discloses a device having a shaft which extends transversely in a longitudinal direction of a commercial vehicle. A lever unit serves for actuation of the shaft, and is mechanically coupled thereto. The lever unit is configured to bring a cabin into a tipped-state and a highly tilted state, where cabin is unlockable and lockable in tipped-state. The lever unit is used for rotating and axial displacement of the shaft and for tilting the cab. However, the '259 reference involves use of a complex mechanism with a high part-count which will require a lot of time, and effort to be operated. Further, as a single shaft extends transversely, the shaft may be susceptible to bending and thereby leading to difficulties in operation of the shaft.

SUMMARY

In an aspect of the present disclosure, a lock mechanism for a tiltable operator cab of a machine is provided. The lock mechanism includes a first bracket which receives a first engagement member of the operator cab. The operator cab is pivotably coupled to an end of the machine. A second bracket receives a second engagement member of the operator cab. The second bracket is located at an offset spaced apart from the first bracket. The lock mechanism includes a sliding member having a first locking pin and a second locking pin. The sliding member slides between a first position and a second position. When the sliding member is in the first position, the first locking pin locks the first bracket with the first engagement member, and the second locking pin locks the second bracket with the second engagement member such that the sliding member locks a tilt motion of the operator cab.

In another aspect of the present disclosure, a method to lock a tilt motion of a tiltable operator cab of a machine is provided. The method includes providing a first bracket which receives a first engagement member of the operator cab. The method includes providing a second bracket which receives a second engagement member of the operator cab. The second bracket is located at an offset spaced apart from the first bracket. The method further includes providing a sliding member having a first locking pin and a second locking pin. The sliding member slides between a first position and a second position. The method includes effecting a sliding movement of the sliding member to the first position. When the sliding member is in the first position, the first locking pin locks the first bracket with the first engagement member, and the second locking pin locks the second bracket with the second engagement member such that the sliding member locks the tilt motion of the operator cab.

In yet another aspect of the present disclosure, a machine is provided. The machine includes a tiltable operator cab having a first engagement member and a second engagement member. The machine includes a lock mechanism for the operator cab. The lock mechanism includes a first bracket which receives the first engagement member of the operator cab. The operator cab is pivotably coupled to an end of the machine. A second bracket receives the second engagement member of the operator cab. The second bracket is located at an offset spaced apart from the first bracket. The lock mechanism includes a sliding member having a first locking pin and a second locking pin. The sliding member slides between a first position and a second position. When the sliding member is in the first position, the first locking pin locks the first bracket with the first engagement member, and the second locking pin locks the second bracket with the second engagement member such that the sliding member locks a tilt motion of the operator cab.

DETAILED DESCRIPTION

Figure 1:
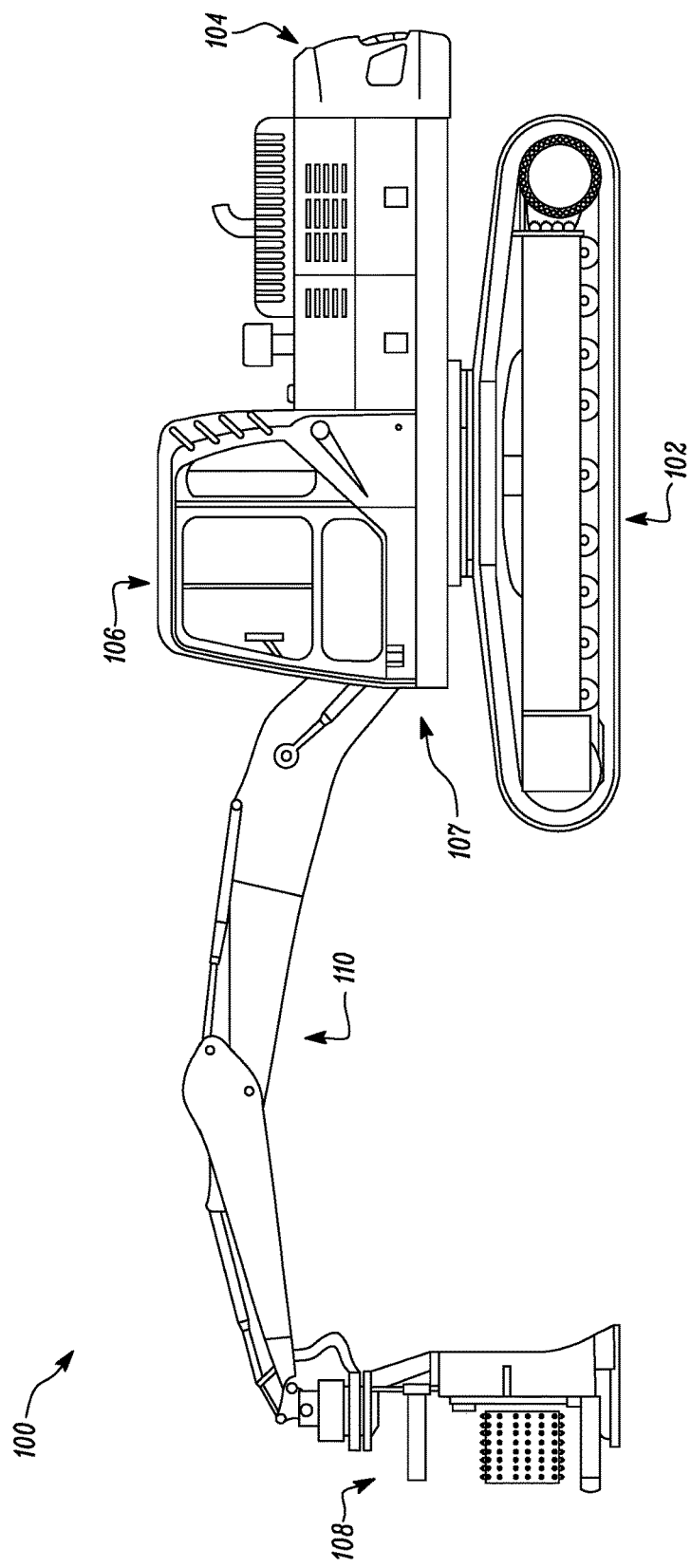
FIG. 1 illustrates an exemplary machine, in accordance with an aspect of the present disclosure.

Wherever possible, the same reference numbers will be used throughout the drawings to refer to the same or like parts. FIG. 1 illustrates an exemplary machine 100 in accordance with an aspect of the present disclosure. Although, the machine 100 is illustrated as a harvester, it should be contemplated that the machine 100 may be any other machine such as trucks, pavers, compactors or any other constructional machine which may be suitable for application with various aspects of the present disclosure. Further, the present disclosure may be readily applicable to any tiltable unit which needs to be generally locked as would be appreciated by a person having ordinary skill in the art.

The machine 100 includes a ground engaging member 102 for propelling the machine on a ground surface. An engine compartment 104 may include an engine, a transmission and the like of the machine 100 for producing power required to propel the machine 100 on the ground surface. The machine 100 includes an operator cab 106 mounted around the engine compartment 104 of the machine 100. The operator cab 106 is mounted on a front end 107 of the machine 100 for easy access and visibility for an operator.

The engine compartment 104 generally remains shielded by the operator cab 106, particularly during a running state of the machine 100. Further, the machine 100 includes an implement 108 that is actuated through a boom 110 of the machine 100. Further, control of the implement 108 may be performed from inside the operator cab 106 of the machine 100. The machine 100 may include various other components and systems for efficiently operating the machine. However, any such components and systems are not discussed in the context of the present disclosure. It should be contemplated that the present disclosure is not limited by any such components and systems in any manner.

The operator cab 106 may have primary positions as a substantially horizontal position (alternatively, a first position) and a tilted position (alternatively, a second position), thereby allowing a tilt motion of the operator cab 106 as elaborated hereinafter. The operator cab 106 is configured to remain in the substantially horizontal position, as shown presently, during any normal working operation of the machine 100, wherein the machine 100 is expected to involve movements and operations warranting a stable, horizontal position of the operator cab 106. However, the operator cab 106 may be tilted over (as shown in FIG. 2) to the second position so that an operator or a service personnel may access the engine compartment 104 which remains shielded in the first position of the operator cab 106.

For accessing underneath and around the operator cab 106, there may be a hydraulic system (not shown for clarity considerations) for ease of tilting of the operator cab 106. The hydraulic system may be synchronized with a lock mechanism 200 (shown in FIG. 2) for ease of actuating of the operator cab 106, between the first position and the second position, by the operator. The present disclosure is not to be limited by the type/configuration/components of the hydraulic system in any manner due to applicability of any hydraulic system as known or used in the art.

Figure 2:
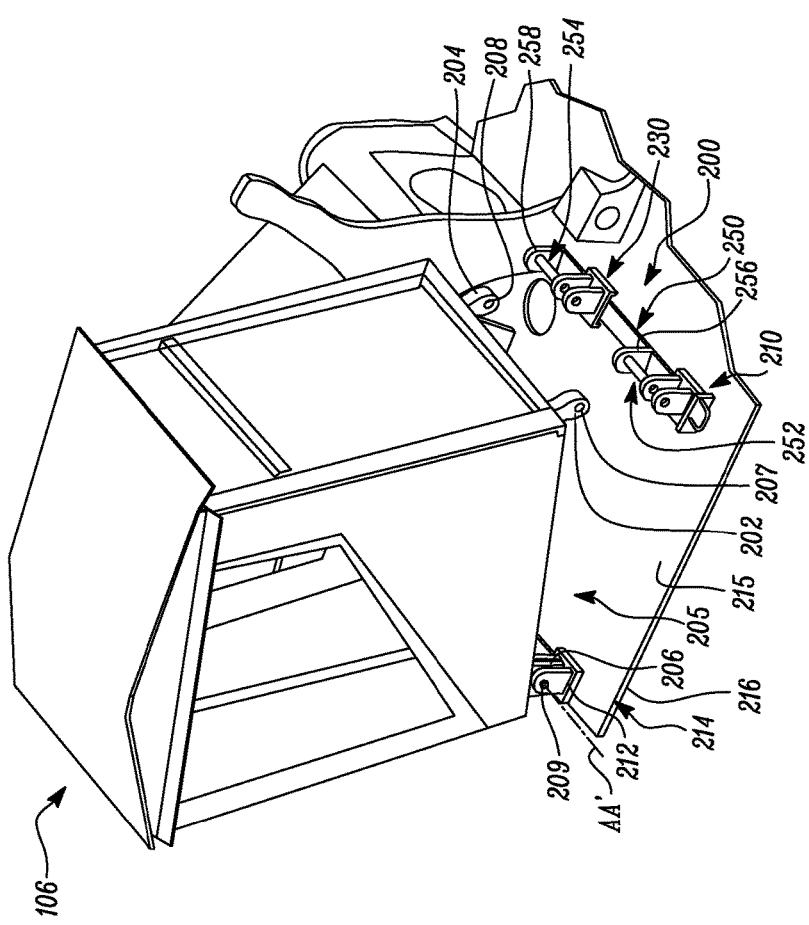
FIG. 2 illustrates an exemplary perspective view of an operator cab along with a lock mechanism for the machine, in accordance with an aspect of the present disclosure.

FIG. 2 illustrates the operator cab 106 of the machine 100 in the second position along with the lock mechanism 200. The operator cab 106 has been shown without the engine compartment 104 of the machine 100 from clarity and aesthetical considerations. The machine 100 comprises the operator cab 106 having a first engagement member 202 and a second engagement member 204. The first engagement member 202 and the second engagement member 204 are removably attached at a bottom 205 of the operator cab 106 for engagement with the lock mechanism 200 of the present disclosure. In some embodiments, the first engagement member 202 and the second engagement member 204 are removably attached to the operator cab 106, however any suitable joining mechanism known in the art such as welding, riveting, bolting may also be used. This allows ease of replacement and maintenance of the first engagement member 202 and the second engagement member 204, if needed.

The operator cab 106 is mounted using a four point mount arrangement. The four point mount arrangement includes two front engagement members 206 (only one front engagement member 206 is visible in FIG. 2) which are coupled to the operator cabin 106. The machine 100 includes two pivot brackets 212 (only one pivot bracket 212 visible in FIG. 2) secured to a floor 214 of the machine 100. The floor 214 of the machine 100 is defined by a top surface 215 and a bottom surface 216. More specifically, the pivot brackets 212 are coupled to the top surface 215 of the floor 214 of the machine 100. The front engagement member 206 may include an opening (not visible) along a pivot axis A-A' through which a fastener 209 passes to engage the front engagement member 206 to the pivot bracket 212 in a pivoted manner. The pivot bracket 212 also includes an opening (not shown) to receive the fastener 209 therewithin. The front engagement members 206 of the operator cab 106 are pivotally engaged with the pivot brackets 212 to allow the tilt motion of the operator cab 106.

The first engagement member 202 and the second engagement member 204 include an opening 207 and an opening 208 respectively for locking the first engagement member 202 and the second engagement member 204 with the locking mechanism 200. The first engagement member 202 and the second engagement member 204 secure the operator cab 106 to the lock mechanism 200 to check any undesirable movement of the operator cab 106, as will be desired for a non-steady state of the machine 100. Once the lock mechanism 200 is in a locked state, the operator cab 106 remains in the horizontal position. The present disclosure is not to be limited by the shape, number and position of the first engagement member 202 and the second engagement member 204.

The lock mechanism 200 includes a first bracket 210 which receives the first engagement member 202 of the operator cab 106. The lock mechanism 200 includes a second bracket 230 which receives the second engagement member 204 of the operator cab 106. The second bracket 230 is located at an offset spaced apart from the first bracket 210. The lock mechanism 200 includes a sliding member 250 having a first locking pin 252 and a second locking pin 254. The first locking pin 252 is mounted on a first mounting member 256 and the second locking pin 254 is mounted on a second mounting member 258. The first mounting member 256 and the second mounting member 258 may be coupled to the sliding member 250 through any suitable joining means. The first mounting member 256 and the second mounting member 258 may also be integral part of the sliding member 250. The sliding member 250 slides between the first position and the second position.

Figure 3:
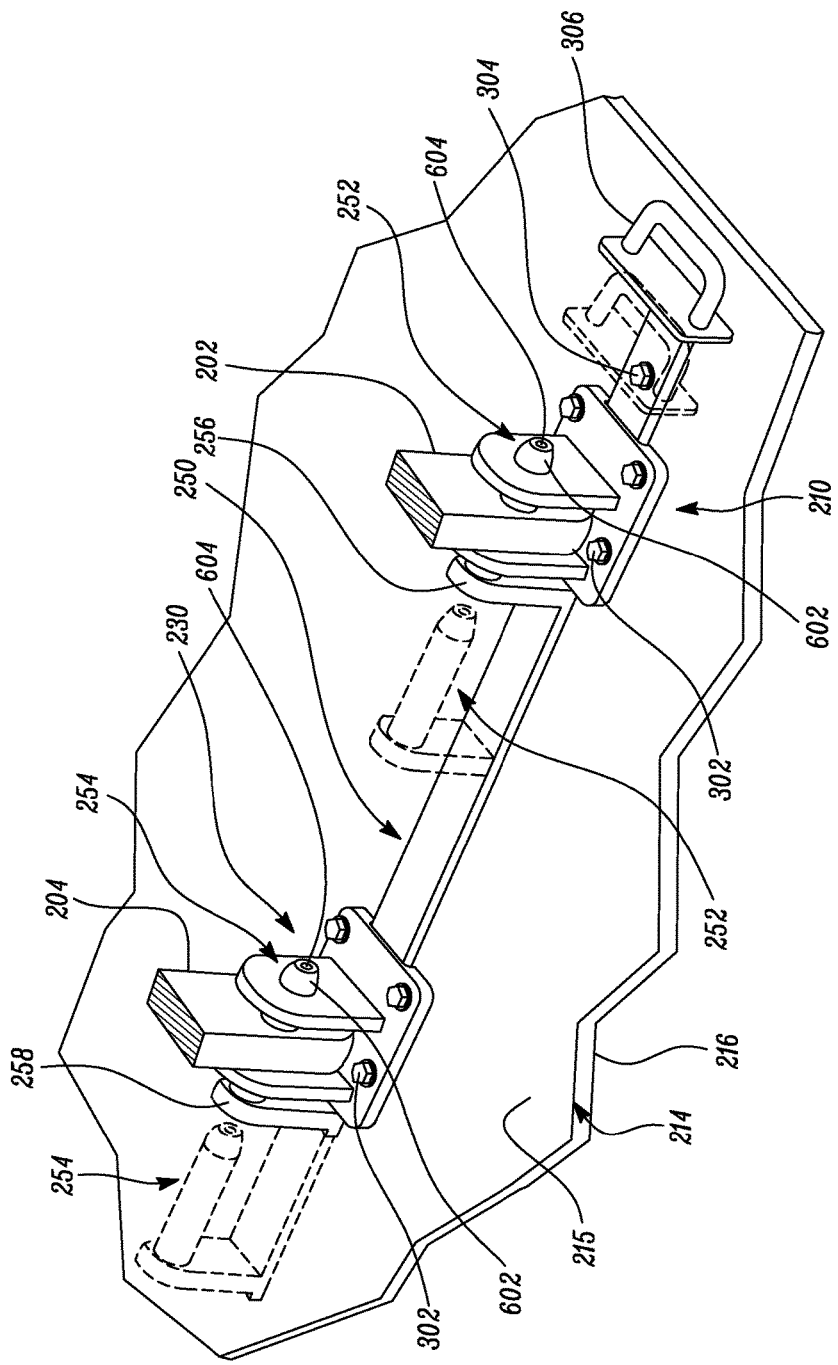
FIG. 3 illustrates an exemplary perspective view of the lock mechanism, in accordance with an aspect of the present disclosure.

FIG. 3 illustrates the lock mechanism 200 for the operator cab 106. The sliding member 250 shown with solid lines represents the first position of the sliding member, and the sliding member 250 shown with dotted lines represents the second position of the sliding member 250. When the sliding member 250 is in the first position, the first locking pin 252 locks the first bracket 210 with the first engagement member 202, and the second locking pin 254 locks the second bracket 230 with the second engagement member 204 such that the sliding member 250 locks the tilt motion of the operator cab 106. From safety and stability considerations, the first bracket 210 and the second bracket 230 are secured to the machine 100 through bolts 302. Further, the lock mechanism 200, more particularly the sliding member 250, is secured to the machine 100 by a locking bolt 304. The lock mechanism 200 further has a provision of a handle 306 that allows the operator to readily move the sliding member 250 between the first position and the second position.

The first bracket 210 and the second bracket 230 are secured in an aligned manner along the top surface 215 of the floor 214 of the machine 100 with the bolts 302. The alignment of the first bracket 210 and the second bracket 230 allows uninterrupted movement of the sliding member 250, provided the sliding member 250 is free to slide i.e. the locking bolt 304 is not in the locked state. Furthermore, the first bracket 210 and the second bracket 230 are secured, as shown through various illustrations of the present disclosure, through the bolts 302 which are provided around corners of the first bracket 210 and the second bracket 230 from safety and load considerations. Moreover, the bolts 302 of the present disclosure may be readily replaced with any other suitable securing means as used or implemented in the art such as, but not limited to, screws, rivets, clips or even welding. Further, there may be any number of the bolts 302 in accordance with the lock mechanism 200 as would be evident to a person having ordinary knowledge in the art.

Figure 4A:
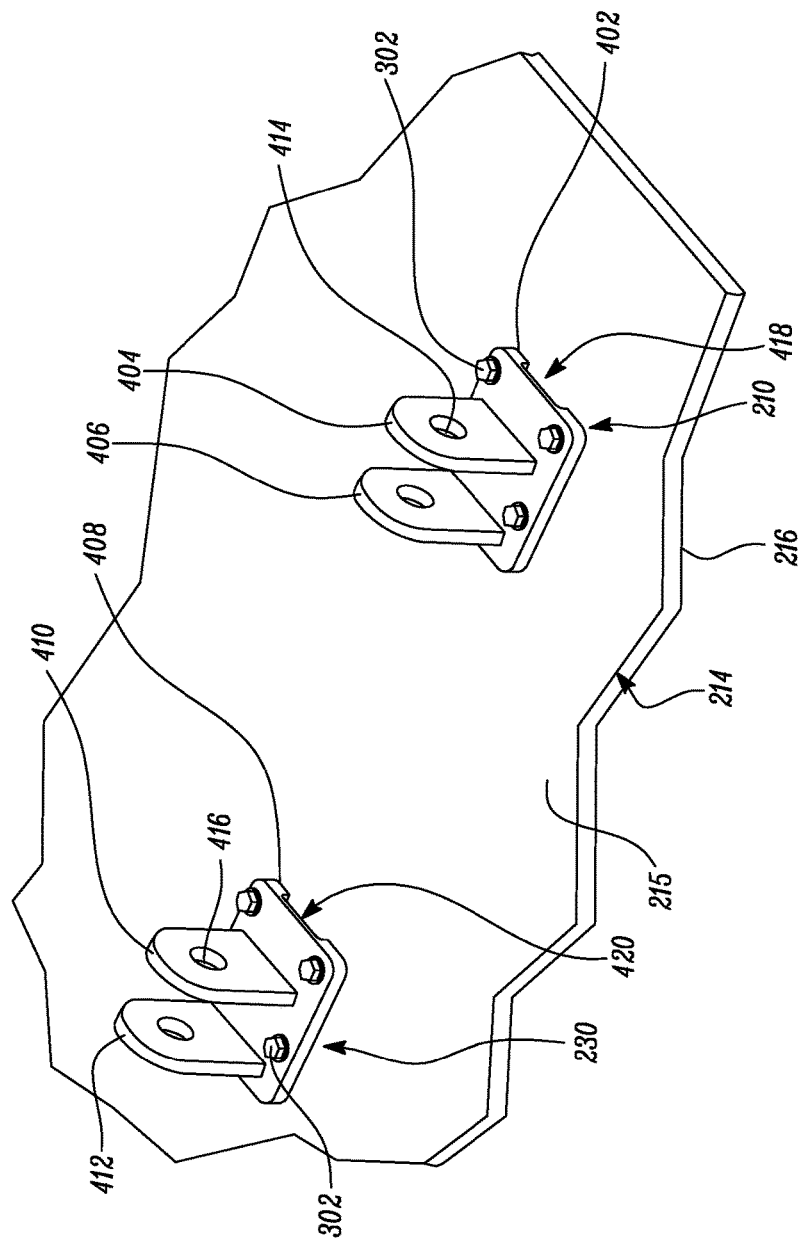
FIG. 4A illustrates an exemplary perspective view of a first bracket and a second bracket of the lock mechanism, in accordance with an aspect of the present disclosure.

FIG. 4A illustrates the first bracket 210 and the second bracket 230 of the lock mechanism 200. The first bracket 210 has a first base plate 402, a first plate 404, and a second plate 406. The first plate 404 and the second plate 406 are illustrated as being secured perpendicularly to the first base plate 402. It should be contemplated that the first plate 404 and the second plate 406 may be secured to the first base plate 402 at any other suitable angle as well as per the need of the present disclosure. Further, the first plate 404 and the second plate 406 are secured at an offset on the first base plate 402 so as to accommodate the first engagement member 202 during locking of the operator cab 106. Particularly, the first plate 404 and the second plate 406 are each provided with an aperture 414 which allows the first locking pin 252 to pass therethrough on movement of the sliding member 250 between the first position and the second position.

The second bracket 230 has a second base plate 408, a third plate 410, and a fourth plate 412. The third plate 410 and the fourth plate 412 are illustrated as being secured perpendicularly to the second base plate 408. It should be contemplated that the third plate 410 and the fourth plate 412 may be secured to the second base plate 408 at any other suitable angle as well as per the need of the present disclosure. Further, the third plate 410 and the fourth plate 412 are secured at an offset on the second base plate 408 so as to accommodate the second engagement member 204 during locking of the operator cab 106. Particularly, the third plate 410 and the fourth plate 412 are each provided with an aperture 416 which allows the second locking pin 254 to pass therethrough on movement of the sliding member 250 between the first position and the second position.

The first bracket 210 has a clearance space 418 underneath the first bracket 210 to allow the sliding member 250 to slide underneath the first bracket 210 while sliding between the first position and the second position. More particularly, the first base plate 402 of the first bracket 210 defines the clearance space 418 with respect to the top surface 215 of the floor 214 of the machine 100. Shape of the first base plate 402 is such that the clearance space 418 exits underneath the first bracket 210 to allow unrestricted movement of the sliding member 250 thereunder.

Similarly, the second bracket 230 has a clearance space 420 underneath the second bracket 230 to allow the sliding member 250 to slide underneath the second bracket 230 while sliding between the first position and the second position. During implementation, the clearance space 418 and the clearance space 420 may preferably be substantially equal for ease of movement of the sliding member 250 therethrough. Moreover, there may be an additional space apart from the clearance space 418 and the clearance space 420 underneath the first bracket 210 and the second bracket 230 respectively to secure the first bracket 210 and the second bracket 230 to the top surface 215 of the floor 214 of the machine 100 through bolts 302. Notably, the present disclosure may also be implemented with only one bracket around center of the bottom 205 of the operator cab 106, and two rubber supports provided around extreme ends of the operator cab 106. However, any number of brackets may be provided, and the present disclosure is not to be limited by the number, type, configurations of brackets in any manner.

Figure 4B:
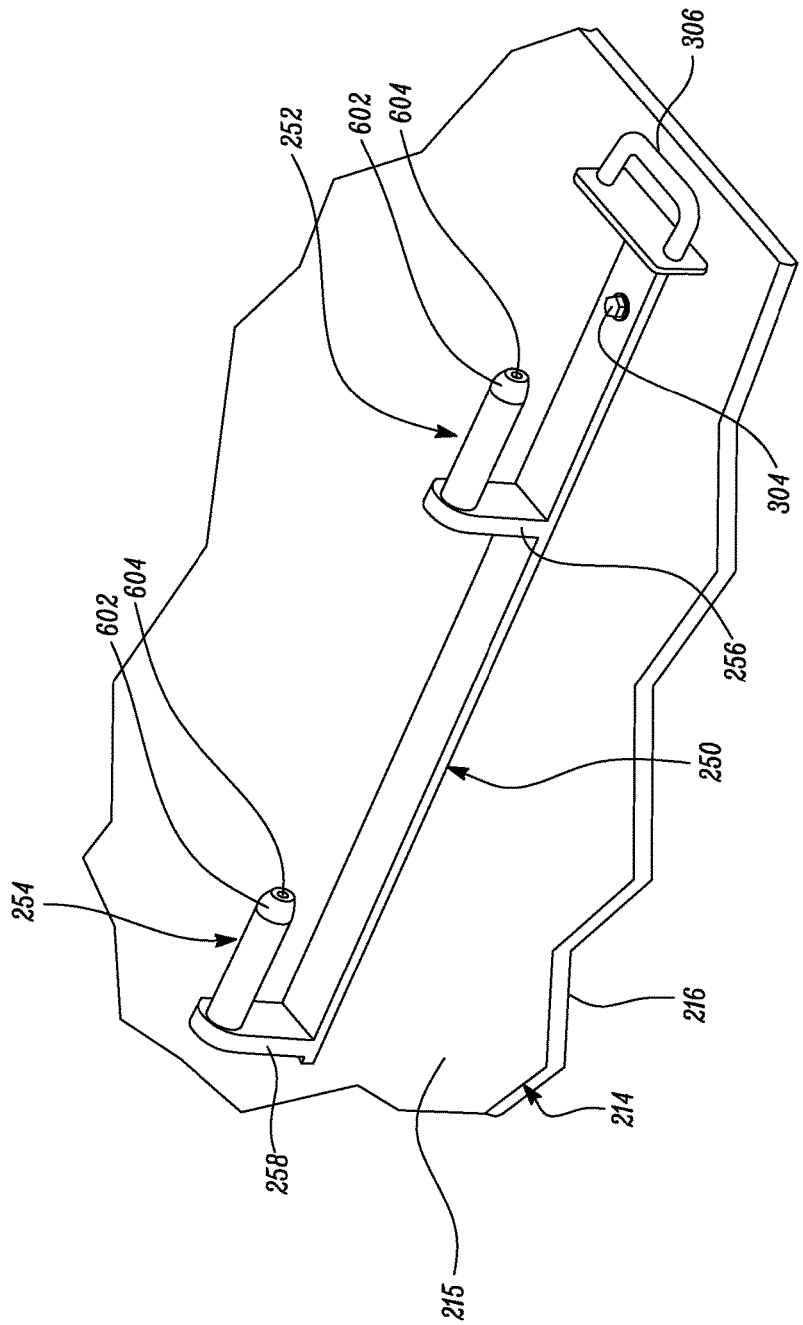
FIG. 4B illustrates an exemplary perspective view of a sliding member of the lock mechanism, in accordance with an aspect of the present disclosure.

FIG. 4B illustrates the sliding member 250 of the lock mechanism 200. The sliding member 250 may be in the form of a flat horizontal bar with dimensions in accordance with the clearance space 418 (Refer FIG. 4A) and the clearance space 420 underneath the first bracket 210 and the second bracket 230 respectively. There may be a certain degree of tolerance between the dimensions i.e. width and height of the sliding member 250, and the clearance space 418 and the clearance space 420 underneath the first bracket 210 and the second bracket 230 respectively, for ease of movement of the sliding member 250 therethrough. Further, the sliding member 250 is provided with a slot 502 (shown in FIG. 5), preferably near the handle 306 for ease of access to the operator for making a change in the locked state of the locking bolt 304. The slot 502 allows selectively securing the locking bolt 304 with the top surface 215 of the floor 214 of the machine 100 depending upon desired position of the sliding member 250.

With combined reference to FIGS. 3 and 4, the first position of the sliding member 250 (shown in solid lines in FIG. 3) allows locking of the operator cab 106, by the lock mechanism 200. More particularly, the operator cab 106 is configured to engage with the first bracket 210 and the second bracket 230 such that the first engagement member 202 and the second engagement member 204 of the operator cab 106 align with the first bracket 210 and the second bracket 230 respectively. More particularly, the first engagement member 202 and the second engagement member 204 securely fit between the first plate 404 and the second plate 406, and the third plate 410 and the fourth plate 412, respectively. In the first position of the sliding member 250, the first locking pin 252 of the sliding member 250 passes through the aperture 414, the opening 207 of the first bracket 210, and the first engagement member 202 respectively. Further, the second locking pin 254 passes through the aperture 416, the opening 208 of the second bracket 230, and the second engagement member 204 respectively.

Referring to FIG. 3 the second position which is also the unlocked position of the sliding member 250 allows the tilt motion of the operator cab 106. The first engagement member 202 and the second engagement member 204 remain free to move out of engagement with the first bracket 210 and the second bracket 230. More specifically, the opening 207 in the first engagement member 202 does not engage the first locking pin 252, and the opening 208 in the second engagement member 204 does not engage the second locking pin 254. In this position, the first locking pin 252 and the second locking pin 254 remain free of any engagement with the first bracket 210 and the second bracket 230 respectively, and therefore the operator cab 106 may be safely tilted, for which assistance may be provided by the hydraulic system.

Figure 5:
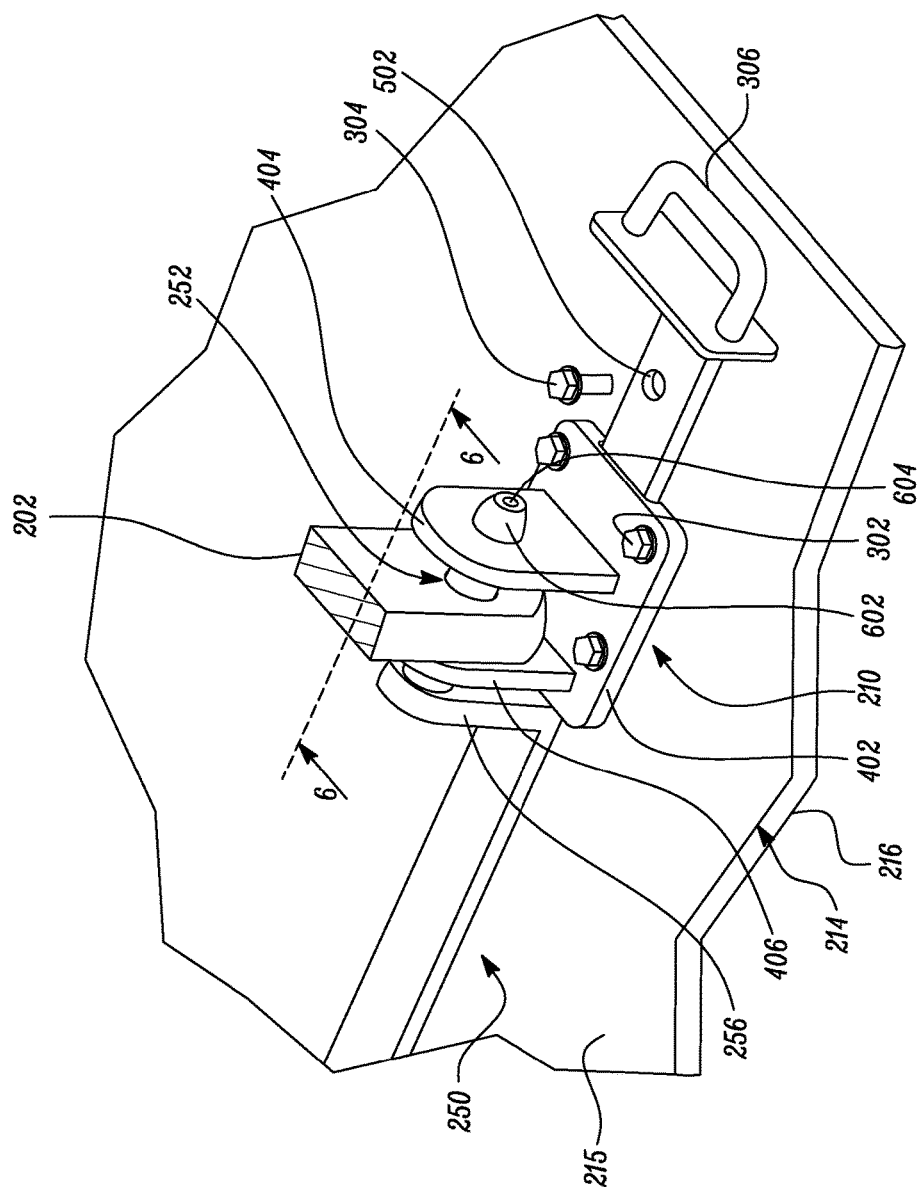
FIG. 5 illustrates an exemplary perspective view of the first bracket and the sliding member for the lock mechanism in the first position, in accordance with an aspect of the present disclosure.

FIG. 5 illustrates the first bracket 210 and the sliding member 250 of the lock mechanism 200 in the first position. As illustrated, the locking bolt 304 is not in the locked state with respect to the slot 502 provided on the sliding member 250. Once the locking bolt 304 is removed, the sliding member 250 remains free to move between the first position and the second position. However, the locking bolt 304 may be used to again lock the sliding member 250, to the top surface 215 of the floor 214 of the machine 100, as the locking bolt 304 locks the sliding member 250 in the first position. Particularly, the bottom surface 216 of the floor 214 may be provided with a lock nut 606 (shown in FIG. 6) welded beneath the floor 214 of the machine 100, or the slot 502 may include threads to receive the locking bolt 304. This ensures safe working of the lock mechanism 200 and thereby the prevents the operator cab 106 of the machine 100 from inadvertent operation such as unlocking of the locking mechanism 200.

The operator cab 106 is pivotably connected at the front end 107 of the machine 100. To allow the tilt motion of the operator cab 106, first the locking bolt 304 is removed. Afterwards, the hydraulic system may be actuated such that weight of the operator cab 106 is taken up by the hydraulic system. Then, the sliding member 250 is moved to the second position. The sliding member 250 includes the handle 306 to allow the operator to move the sliding member 250 from the first position to the second position. Alternatively, the present disclosure may be implemented without application of the handle 306. The present disclosure is not to be limited by the choice of the locking bolt 304 and the handle 306 in any manner.

Figure 6:
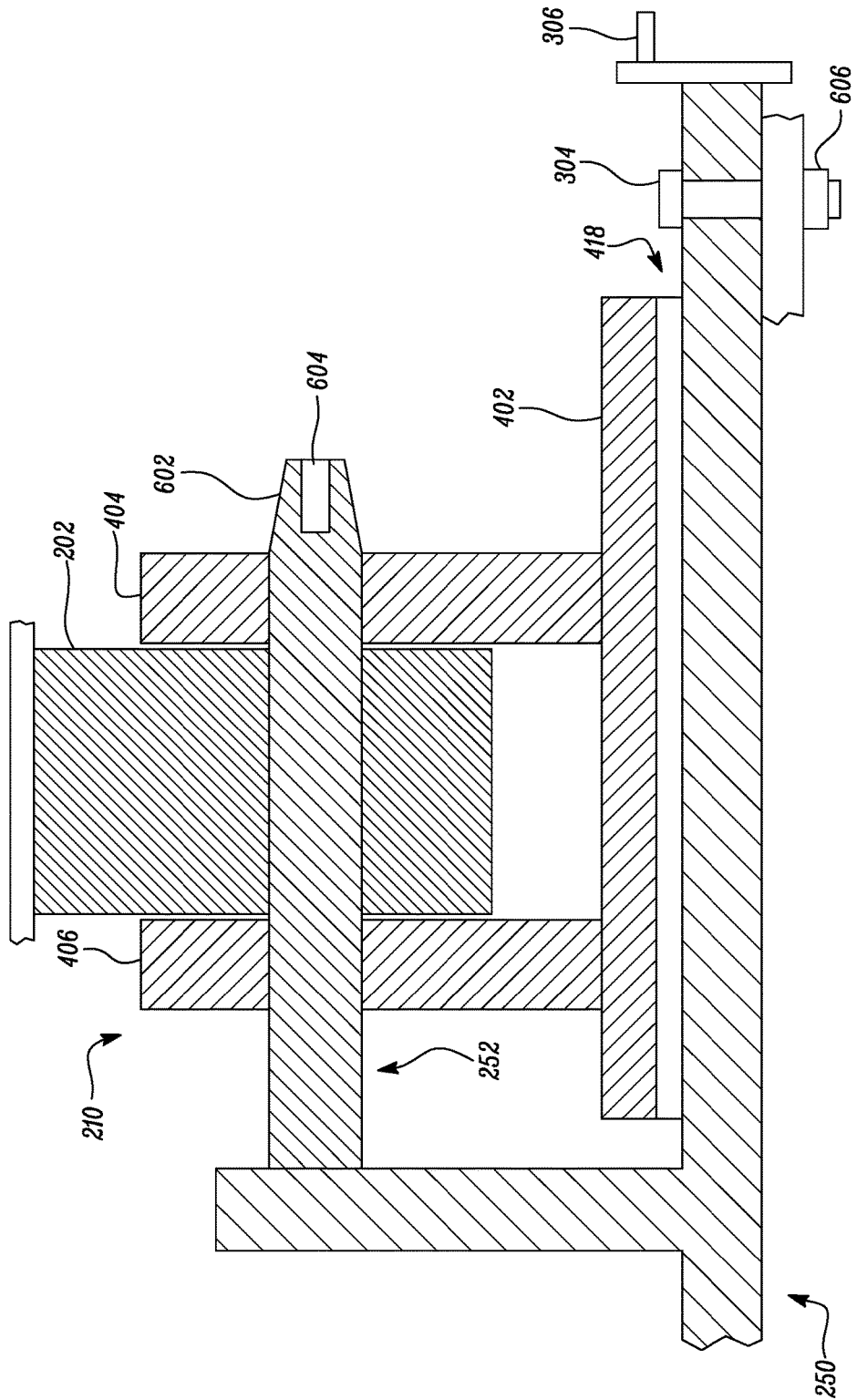
FIG. 6 illustrates an exemplary cross-sectional view of the first bracket and the sliding member for the lock mechanism in the first position, in accordance with an aspect of the present disclosure.

FIG. 6 illustrates an exemplary cross-sectional view along section 6-6 of the first bracket 210 and the sliding member 250 for the lock mechanism 200 in the first position. The figure illustrates only the first locking pin 252. Both the first locking pin 252 and the second locking pin 254 have a tapered profile 602 around respective tip ends thereof. Additionally, each of the first locking pin 252 and the second locking pin 254 have a surface defining a blind hole 604 at their respective tip ends. The tapered profile 602 is provided for ease of entry of the first locking pin 252 into the aperture 414 of the first bracket 210. The blind hole 604 is provided to manually address any malfunction, such as for example, jamming of the lock mechanism 200, particularly the sliding member 250.

In some embodiments, jamming of the sliding member 250, for whatsoever reason, may lead to considerable implications to disengage or unlock the locking mechanism. In such instances, the blind hole 604 allows a simple hand tool to be inserted (not shown) there within to actuate desired movement of the sliding member 250 by applying a hammering force to the first engagement pin 252 via the hand tool. The simple hand tool may be a chisel or a screw driver.

Length and diameter of the first locking pin 252 and the second locking pin 254 may be in the range of about 680-720 mm (preferably 680 mm) and 40-50 mm (preferably 40 mm) respectively. Size of the first locking pin 252 and the second locking pin 254 may vary depending upon expected loads acting on the first locking pin 252 and the second locking pin 254. In order to access the magnitude of such loads, several factors such as operator cabin weight, material of the locking mechanism 200, acceleration forces during working on rough terrains or roads with bumps may be taken into consideration. In some embodiments, a factor of safety of 2 and above may be considered for defining size of the first locking pin 252 and the second locking pin 254.

INDUSTRIAL APPLICABILITY

Figure 7:
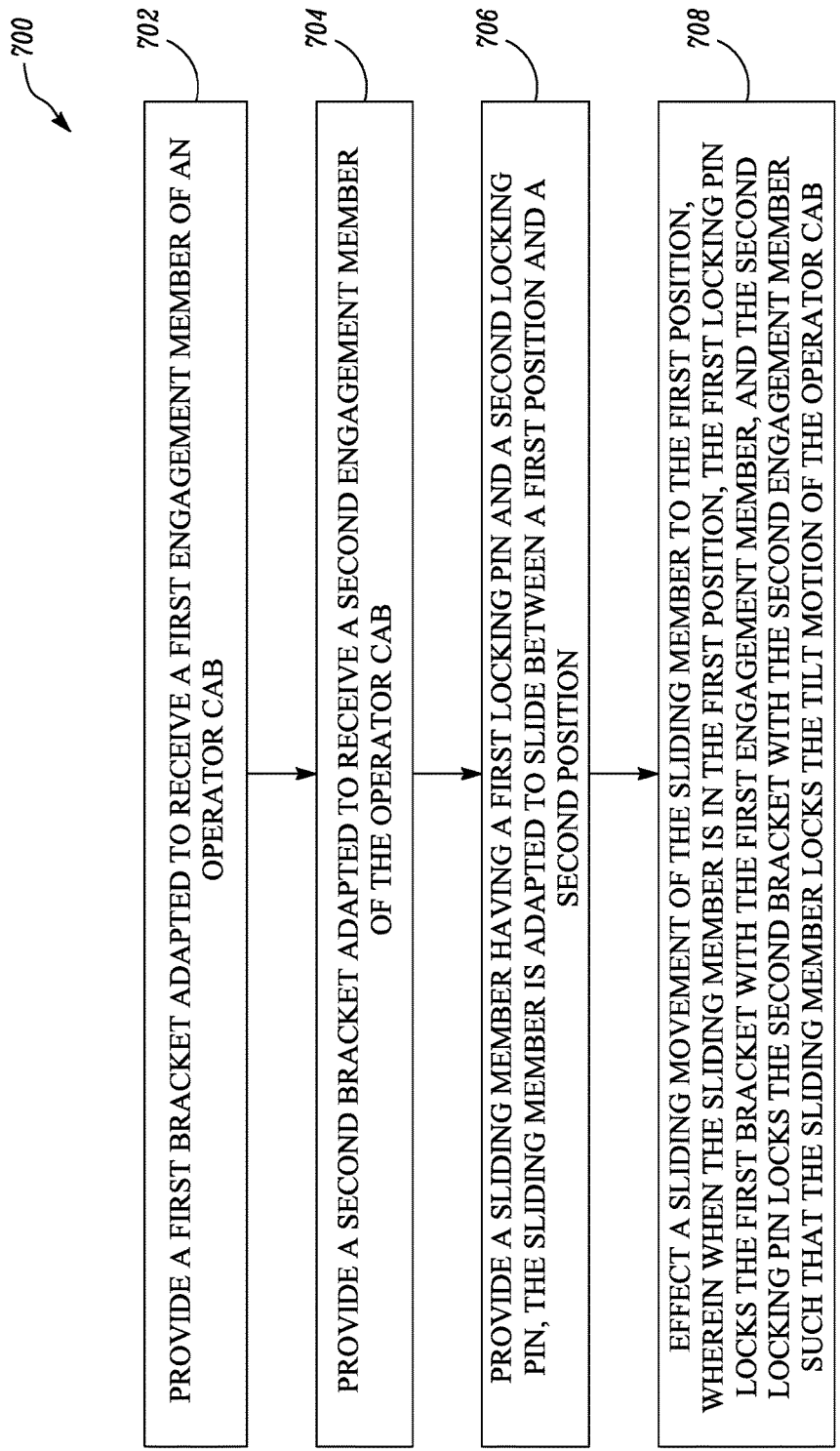
FIG. 7 illustrates a flowchart for a method to lock a tilt motion of the operator cab of the machine, in accordance with an aspect of the present disclosure.

FIG. 7 illustrates a method 700 for locking the operator cab 106 to the machine 100 and preventing a tilt motion of the operator cab 106. The method 700 may start with actuating the hydraulic system such that the weight of the operator cab 106 is taken up by the hydraulic system. At step 702, the method 700 provides the first bracket 210 which receives the first engagement member 202 of the operator cab 106. At step 704, the method 700 provides the second bracket 230 which receives the second engagement member 204 of the operator cab 106. The second bracket 230 is located at an offset spaced apart from the first bracket 210.

Referring to FIG. 4A, the first bracket 210 has the clearance space 418 underneath the first bracket 210 to allow the sliding member 250 to slide underneath the first bracket 210. The second bracket 230 has the clearance space 420 underneath the second bracket 230 to allow the sliding member 250 to slide underneath the second bracket 230. Moreover, provision of bolts 302 also allows ease of replacement of one or more of the first bracket 210, the second bracket 230, and the sliding member 250, if required.

At step 706, the method 700 provides the sliding member 250 having the first locking pin 252 and the second locking pin 254. The sliding member 250 slides between the first position and the second position. The present disclosure further provides the locking bolt 304 which locks the sliding member 250 and, in turn, the lock mechanism 200 in the first position. This allows safe operation of the operator cab 106 during normal working of the machine 100. Furthermore, provision of the handle 306 in vicinity of the locking bolt 304 allows a compact design as well as ease of implementation of the lock mechanism 200.

At step 708, the method 700 allows effecting the sliding movement of the sliding member 250 to the first position. When the sliding member 250 is in the first position, the first locking pin 252 locks the first bracket 210 with the first engagement member 202, and simultaneously the second locking pin 254 locks the second bracket 230 with the second engagement member 204 such that the sliding member 250 locks the tilt motion of the operator cab 106. Thus, the present disclosure provides a simple, convenient and compact lock mechanism 200 which allows ease of locking or tilting of the operator cab 106 with a single movement of the sliding member 250 which has smart placement of the pins i.e. the first locking pin 252 and the second locking pin 254.

Further, the tapered profile 602 of the first engagement pin 252 (as well as the second engagement pin 254) allows easy engagement and takes care of any aperture and pin misalignments. Then, since the sliding member 250 has two integrated lock pins, both the pins may be engaged and disengaged simultaneously by applying a simple pull and push force to the handle 304. Notably, provision of smaller or shorter pins, as compared to conventional lock mechanisms such as single long pins, is expected to prevent the smaller or the shorter pins from bending due to load of the operator cab 106 among other working forces. This takes prominence due to increased chances of jamming of the lock mechanism 200 due to bending of the pin. Moreover, disengaging of a jammed lock mechanism may be readily performed by applying force to the blind hole 604 using a simple hand tool. Since the first engagement pin 252 and the second engagement pin 254 are interconnected, disengagement of any one of the pins would lead to disengagement of the other pin.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A lock mechanism for an operator cab of a machine, the lock mechanism comprising:
    a first bracket adapted to receive a first engagement member of the operator cab, the operator cab pivotably coupled at one end of the machine;
    a second bracket adapted to receive a second engagement member of the operator cab, wherein the second bracket is spaced apart from the first bracket; and
    a sliding member having a first locking pin and a second locking pin, the sliding member adapted to slide between a first position and a second position,
    wherein when the sliding member is in the first position, the first locking pin locks the first bracket with the first engagement member, and the second locking pin locks the second bracket with the second engagement member such that the sliding member locks a tilt motion of the operator cab.

2. The lock mechanism of claim 1, wherein the sliding member in the second position allows the tilt motion of the operator cab, wherein the operator cab is pivotably connected at one end of the machine.

3. The lock mechanism of claim 1, wherein a locking bolt locks the sliding member in the first position.

4. The lock mechanism of claim 1, wherein the first locking pin and the second locking pin have a tapered profile around respective tip ends thereof, and wherein the first locking pin and the second locking pin have a surface defining a blind hole at the respective tip ends.

5. The lock mechanism of claim 1, wherein the first engagement member and the second engagement member are removably coupled to the operator cab.

6. The lock mechanism of claim 1, wherein the sliding member includes a handle.

7. The lock mechanism of claim 1, wherein the first bracket and a surface of the machine define a clearance space underneath the first bracket, such that the sliding member slides underneath the first bracket through the clearance space while sliding between the first position and the second position.

8. The lock mechanism of claim 1, wherein the second bracket and a surface of the machine define a clearance space underneath the second bracket, such that the sliding member slides underneath the second bracket through the clearance space while sliding between the first position and the second position.

9. A method to lock a tilt motion of an operator cab of a machine, the method comprising:
    providing a first bracket adapted to receive a first engagement member of the operator cab, the operator cab pivotably coupled at one end of the machine;
    providing a second bracket adapted to receive a second engagement member of the operator cab, wherein the second bracket is spaced apart from the first bracket;
    providing a sliding member having a first locking pin and a second locking pin, the sliding member adapted to slide between a first position and a second position; and
    effecting a sliding movement of the sliding member to the first position, wherein when the sliding member is in the first position, the first locking pin locks the first bracket with the first engagement member, and the second locking pin locks the second bracket with the second engagement member such that the sliding member locks the tilt motion of the operator cab.

10. The method of claim 9, wherein the sliding member in the second position allows the tilt motion of the operator cab, wherein the operator cab is pivotably connected at one end of the machine.

11. The method of claim 9, wherein a locking bolt locks the sliding member in the first position.

12. The method of claim 9, wherein the first locking pin and the second locking pin have a tapered profile around respective tip ends thereof, and wherein the first locking pin and the second locking pin have a surface defining a blind hole at the respective tip ends.

13. The method of claim 9, wherein the first engagement member and the second engagement member are removably coupled to the operator cab.

14. The method of claim 9, wherein the sliding member includes a handle.

15. The method of claim 9, wherein the first bracket and a surface of the machine defines a clearance space underneath the first bracket, such that the sliding member slides underneath the first bracket through the clearance space while sliding between the first position and the second position.

16. The method of claim 9, wherein the second bracket and a surface of the machine defines a clearance space underneath the second bracket, such that the sliding member slides underneath the second bracket through the clearance space while sliding between the first position and the second position.

17. A machine comprising:
    an operator cab having a first engagement member and a second engagement member, the operator cab pivotably coupled at one end of the machine;
    a lock mechanism for the operator cab, the lock mechanism comprising:
        a first bracket adapted to receive the first engagement member;
        a second bracket adapted to receive the second engagement member, wherein the second bracket is spaced apart from the first bracket; and
        a sliding member having a first locking pin and a second locking pin, the sliding member adapted to slide between a first position and a second position,
        wherein when the sliding member is in the first position, the first locking pin locks the first bracket with the first engagement member, and the second locking pin locks the second bracket with the second engagement member such that the sliding member locks a tilt motion of the operator cab.

18. The machine of claim 17, wherein a locking bolt locks the sliding member in the first position.

19. The machine of claim 17, wherein the first bracket and a surface of the machine defines a clearance space underneath the first bracket, such that the sliding member slides underneath the first bracket through the clearance space while sliding between the first position and the second position.

20. The machine of claim 17, wherein the second bracket and a surface of the machine defines a clearance space underneath the second bracket, such that the sliding member slides underneath the second bracket through the clearance space while sliding between the first position and the second position.

* * * * *